Patented Sept. 19, 1933

1,927,053

UNITED STATES PATENT OFFICE 1,927,053

PREPARATION OF METHYL ETHER OF TERTIARY BUTYL META CRESOL

Ernest Vonderwahl, Geneva, Switzerland, assignor to Givaudan-Delawanna, Inc., New York, N. Y., a corporation of New York No Drawing. Application August 5, 1930
Serial No. 473,288

14 Claims. (Cl. 260—150)

This invention relates to the preparation of organic compounds and, more particularly, to a process for the preparation of methyl ether of tertiary butyl meta cresol, a compound used in the manufacture of perfumes having a musk-like odor.

Heretofore methyl ether of tertiary butyl meta cresol has been prepared by application of Friedel-Craft's reaction employing meta cresol methyl ether and either isobutyl or tertiary butyl chloride. This method has been very unsatisfactory as the isobutyl chlorides are not easily obtainable, the meta cresol methyl ether obtained contains impurities in the form of isomers which are difficult to remove, and the yield is poor.

According to the present invention, it has been found the above difficulties can be overcome and the yield made to approximate the theoretical yield by reacting, in the presence of anhydrous aluminum chloride $(AlCl_3)$ or equivalent metal chloride, meta cresol methyl ether with isobutylene instead of with isobutyl chloride. Isobutylene can readily be produced by well known methods either from isobutyl or tertiary butyl alcohol by action of a dehydrating agent such as sulphuric acid or by various known catalytic processes.

When conditions are controlled, a practically quantitative yield of methyl ether of tertiary butyl meta cresol, free of isomers, can be obtained. The reaction may be represented by the following equation:

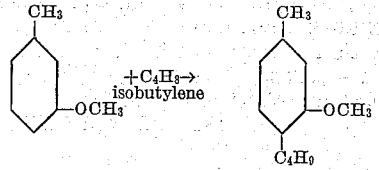

meta cresol methyl ether     methyl ether of tertiary butyl meta cresol

The process is advantageously carried out by introducing a stream of isobutylene from a cylinder or generator into the meta cresol methyl ether containing anhydrous aluminum chloride in a reaction vessel equipped with cooling means. The reaction is exothermic and the reaction vessel should be cooled to keep the temperature of the reaction mixture from rising substantially above 20 or 30° C. as higher temperatures favor the production of deleterious by-products.

The isobutylene is absorbed quantitatively and the risk of loss of isobutylene is very slight. After the reaction has gone to completion which requires a comparatively short period of about half an hour, the reaction liquid is washed until neutral, and fractionated. Meta cresol methyl ether recovered during the fractionation may be reused with fresh isobutylene. The crude methyl ether of tertiary butyl meta cresol can then be further purified by distillation or crystallization and centrifuging or by both methods combined. Methyl ether of tertiary butyl meta cresol distills at 10 mm between 100°–110° C. and crystallizes at 23°–24° C.

The following examples are given to illustrate the invention:

*Example I*

A reaction vessel equipped with cooling means was charged with 250 parts by weight of meta cresol methyl ether and 5 parts by weight of aluminum chloride. 30 parts by weight of isobutylene was introduced with stirring while the temperature was maintained below 30° C. After introduction of the isobutylene, the reaction liquid was stirred for half an hour while maintaining the temperature below 30° C. The reaction liquid was then fractionated, the excess meta cresol methyl ether recovered, and the crude methyl ether of tertiary butyl meta cresol was then purified by fractionating again and crystallizing. A yield of 80 parts by weight of methyl ether of tertiary butyl meta cresol in very pure state was obtained. This yield, based on the isobutylene used, is very favourable.

*Example II*

This example was carried out under substantially the same conditions as in Example I except that 60 parts by weight of meta cresol methyl ether and 3 parts by weight of aluminum chloride were used. The same amount of isobutylene was used and a yield of 60 parts by weight of methyl ether of tertiary butyl meta cresol were obtained.

*Example III*

This example was carried out under substantially the same conditions as in Example I except that 500 parts by weight of meta cresol methyl ether and 5 parts of aluminum chloride were used. 30 parts by weight of isobutylene were again used and a yield of 80 parts by weight methyl ether of tertiary butyl meta cresol were obtained.

As shown in the specific examples, the proportion of meta cresol methyl ether to isobutylene may vary widely. Stoichiometric proportions may be used or an excess of isobutylene, as in Example II, or an excess of meta cresol methyl ether as in Examples I and III. Where a large excess of meta cresol methyl ether is used, the unreacted portion is recovered and used again.

Instead of anhydrous aluminum chloride, other equivalent anhydrous metal chlorides such as zinc, antimony and ferric chlorides may be used in this process.

The invention claimed is:

1. Process for the preparation of methyl ether of tertiary butyl meta cresol comprising reacting meta cresol methyl ether with isobutylene in the presence of anhydrous aluminum chloride for about half an hour.

2. Process for the preparation of methyl ether of tertiary butyl meta cresol comprising reacting meta cresol methyl ether with isobutylene in the presence of anhydrous aluminum chloride while maintaining the temperature of the reaction mixture below about 30° C.

3. Process for the preparation of methyl ether of tertiary butyl meta cresol comprising reacting meta cresol methyl ether with less than 50% by weight of isobutylene in the presence of anhydrous aluminum chloride for a period of about half an hour.

4. Process for the preparation of methyl ether of tertiary butyl meta cresol comprising reacting an excess of meta cresol methyl ether with isobutylene in the presence of anhydrous aluminum chloride for a period of about half an hour.

5. Process for the preparation of methyl ether of tertiary butyl meta cresol comprising reacting meta cresol methyl ether with less than 50% by weight of isobutylene in the presence of anhydrous aluminum chloride while maintaining the temperature of the reaction mixture below about 30° C.

6. Process for the preparation of methyl ether of tertiary butyl meta cresol comprising passing isobutylene into meta cresol methyl ether in the presence of anhydrous aluminum chloride while agitating the reaction mixture and maintaining the temperature thereof below about 30° C.

7. Process for the preparation of methyl ether of tertiary butyl meta cresol comprising passing less than 50% by weight of isobutylene into meta cresol methyl ether in the presence of anhydrous aluminum chloride while agitating the reaction mixture and maintaining the temperature thereof below about 30° C.

8. Process for the preparation of methyl ether of tertiary butyl meta cresol comprising passing isobutylene into meta cresol methyl ether in the presence of anhydrous aluminum chloride while agitating the reaction mixture and maintaining the temperature thereof below about 30° C., and continuing the agitation and maintaining that temperature until the reaction is complete.

9. Process for the preparation of methyl ether of tertiary butyl meta cresol comprising passing isobutylene into meta cresol methyl ether in the presence of anhydrous aluminum chloride while agitating the reaction mixture and maintaining the temperature thereof below about 30° C., continuing the agitation and maintaining that temperature for about half an hour, washing the reaction mixture with water until neutral, and then separating the methyl ether of tertiary butyl meta cresol by fractionation.

10. Process for the preparation of methyl ether of tertiary butyl meta cresol comprising passing about 30 parts by weight of isobutylene into 60-500 parts by weight of meta cresol methyl ether in the presence of 3-5 parts by weight of anhydrous aluminum chloride while agitating the reaction mixture and maintaining the temperature below about 30° C.

11. Process for the preparation of methyl ether of tertiary butyl meta cresol comprising passing about 30 parts by weight of isobutylene into about 250 parts by weight of meta cresol methyl ether in the presence of anhydrous aluminum chloride while agitating the reaction mixture and maintaining the temperature below about 30° C., and continuing the agitation and maintaining that temperature until the reaction is complete.

12. Process for the preparation of methyl ether of tertiary butyl meta cresol comprising reacting meta cresol methyl ether with isobutylene for about one half an hour in the presence of an anhydrous member selected from the group consisting of aluminum chloride, zinc chloride, antimony chloride and ferric chloride.

13. Process for the preparation of methyl ether of tertiary butyl meta cresol comprising reacting meta cresol methyl ether with isobutylene in the presence of an anhydrous member selected from the group consisting of aluminum chloride, zinc chloride, antimony chloride and ferric chloride while maintaining the temperature of the reaction mixture below about 30° C.

14. Process for the preparation of methyl ether of tertiary butyl meta cresol comprising passing isobutylene into meta cresol methyl ether in the presence of an anhydrous member selected from the group consisting of aluminum chloride, zinc chloride, antimony chloride and ferric chloride while agitating the reaction mixture and maintain the temperature thereof below about 30° C., continuing the agitation and maintaining that temperature for about one half an hour, washing the reaction mixture with water until neutral and then separating the methyl ether of tertiary butyl meta cresol by fractionation.

ERNEST VONDERWAHL.